United States Patent [19]

Blair

[11] 4,336,292
[45] Jun. 22, 1982

[54] MULTI-LAYER HONEYCOMB THERMO-BARRIER MATERIAL

[75] Inventor: Winford Blair, La Mesa, Calif.

[73] Assignee: Rohr Industries, Inc., Chula Vista, Calif.

[21] Appl. No.: 168,661

[22] Filed: Jul. 11, 1980

[51] Int. Cl.³ .................................................. B32B 3/12
[52] U.S. Cl. ..................................... 428/116; 428/593
[58] Field of Search ............... 428/73, 116, 117, 118, 428/593; 244/117 A, 158 A, 163

[56] References Cited

U.S. PATENT DOCUMENTS

| | | | |
|---|---|---|---|
| 2,501,180 | 3/1950 | Kunz | 428/116 |
| 2,609,068 | 9/1952 | Pajak | 428/116 X |
| 2,839,442 | 6/1958 | Whitaker | 428/73 X |
| 3,030,703 | 4/1962 | Wirsing, Jr. | 428/116 X |
| 3,427,706 | 2/1969 | Jaffee | 428/593 X |
| 3,854,194 | 12/1974 | Woodward | 428/593 X |
| 3,905,778 | 9/1975 | Pearson | 428/116 X |
| 4,042,238 | 8/1977 | Theriault | 428/116 X |

Primary Examiner—Henry F. Epstein
Attorney, Agent, or Firm—Patrick J. Schlesinger; Frank D. Gillaim

[57] ABSTRACT

A thermal barrier material comprising at least four vertically stacked cellular cores separated with septum sheets and enclosed at the outer periphery by facing sheets. The components making up the thermal barrier material may be constructed of titanium alloy, TD nickel, niobium, or the like. In one embodiment, one outer facing sheet is highly polished for use as a reflective surface.

12 Claims, 3 Drawing Figures

4,336,292

MULTI-LAYER HONEYCOMB THERMO-BARRIER MATERIAL

BACKGROUND OF THE INVENTION

This invention relates to a lightweight high strength honeycomb sandwich structure and more particularly, to a multi-layer sandwich material for use as a thermal barrier in space reentry vehicles or the like, as a base for lightweight precision laser mirrors and various other thermal barrier applications.

Prior art thermal barrier material used in spacecraft and the like consists of ceramic or a graphite composite material, both of which are extremely fragile and easily broken. Generally, due to the curvilinear contours of the space vehicles, the barrier material generally takes the form of rectangular tiles. These tiles allow for the curvature of their attachment surface and allow for repairs or replacement of individual sections when localized damage occurs. It has been found that during testing, handling, etc., these tiles are continually being broken and require to be replaced. When replacing broken tiles, generally, additional tiles are broken in the process, thus increasing the cost of repairs and length of downtime of the vehicles.

Prior art high intensity mirror bases, such as those used with lasers, are generally constructed of thick metal, such as copper, so as to prevent any surface variations during changes in structure temperature. These copper structures have many disadvantages. The principal disadvantage is excessive weight, especially in areas of use where weight is a premium, such as in aircraft, space vehicles, etc. This excess weight causes considerable wasted energy when the mirror is carried into space, and in addition, when rotatively operated as a directional mirror, the rotation must be provided at a very slow speed because of the mass and the possible overshoot of the mirror and recorrection requirements.

There has not been an entirely satisfactory lightweight high strength material for use as thermal barrier or laser mirrors, especially in spacecraft, until emergence of the instant invention.

SUMMARY OF THE INVENTION

The invention comprises a multi-layer honeycomb sandwich material constructed entirely of titanium alloys, TD nickel, niobium or other super alloys or a combination of at least two different metals herebefore mentioned. When a single type of metal is used, the material is either joined by brazing or liquid interface diffusion bonding, depending on the material type. When a combination of different metals are used in the construction, the combination of brazing and liquid interface diffusion bonding may be required.

It is the primary object of this invention to construct a non-fragile and lightweight thermal barrier material to be utilized in the launching and reentry of space type vehicles.

It is a further object of this invention to provide thermal barrier material that has sufficient strength to be utilized as support structure within the space vehicle.

A still further object of this invention is to provide thermal barrier material that is easily attached and removed from its supporting structure.

A still further object of this invention is to provide thermal barrier material which has high strength and yet is light in weight for use as a base for multi-positional high energy mirror.

These and other objects of and advantages of the invention will become better understood by reference to the following detailed description, when considered with the drawings, in which:

DETAILED DESCRIPTION OF THE FIGURES

Figure 1:
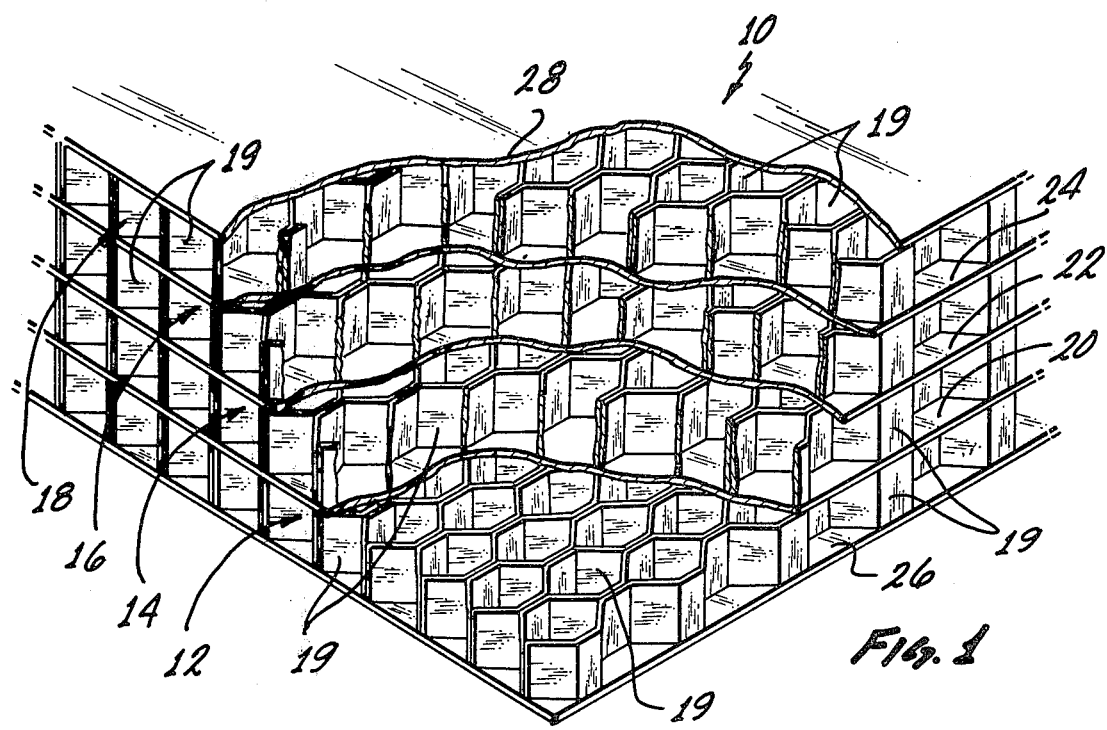
FIG. 1 is a perspective partially cutaway view of a section of the thermal barrier material of the instant invention.
Figure 2:
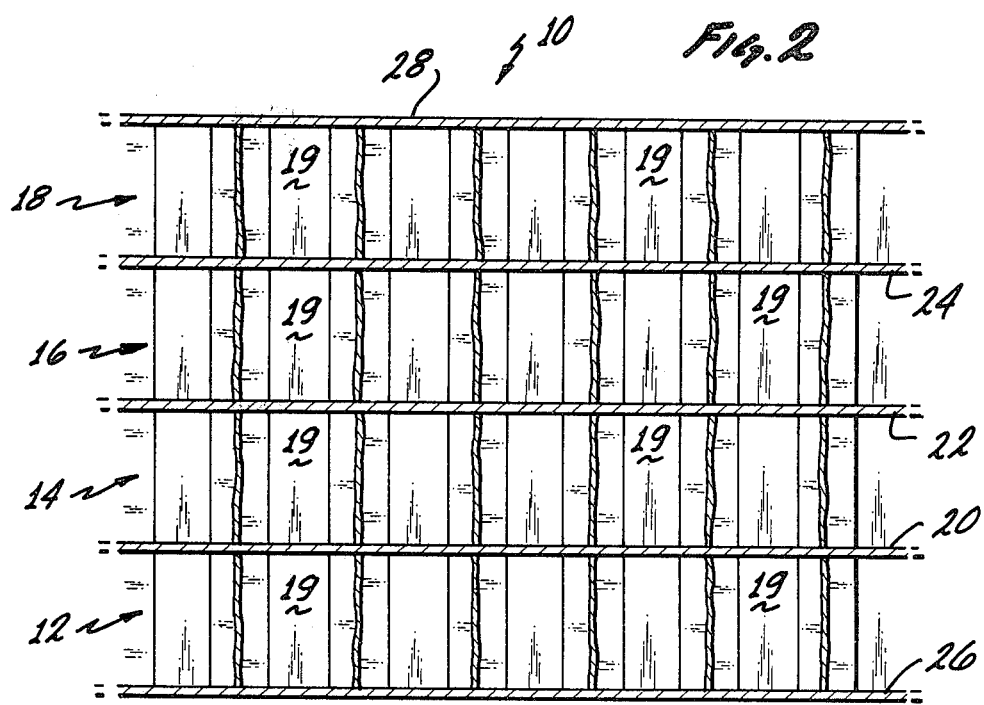
FIG. 2 is an enlarged fragmentary vertical section of the section of thermal barrier material shown in FIG. 1.

Referring now to FIGS. 1 and 2 in detail. There is shown a section of multi-layer honeycomb material 10 comprising four honeycomb cores 12, 14, 16, 18, each of which have a plurality of endwise directed cells 19, three septums sheets 20, 22, 24, positioned between the honeycomb cores and two face sheets 26, 28, covering the outer surfaces of the outer cores.

The material constructed in this manner provides a thermal insulation between the face sheets 26, 28. Specifically, the temperatures to which one face sheet is subjected (the hot face) is reduced substantially when passing through the multi-layer material thereby providing a greatly reduced temperature at the opposite face sheet (the cold face). The temperatures between the hot and cold face sheets depend on the width of the cores and the materials of construction. The required strength in the construction of multi-layer honeycomb material 10 is determined in part by the thickness and material type of the septum and facing sheet. Where expected temperature differentials between the hot and cold facing sheet are, for example, four to one (1000° F. on the hot face sheet and 250° F. on the cold face sheet), titanium may be preferred because of its light weight, resulting in an overall lightweight structure. The core is typically 0.175 to 6.5 inches high, the septum sheets 0.0015 to 0.060 in thickness, and the facing sheet 0.003 to 0.1 inches in thickness. Obviously different material thicknesses may be required of the components depending on the final application of the multi-layer honeycomb material 10 without departing from the scope and intent of the invention. When this desired differences in temperature between the hot and cold face sheets are, for example, in the neighborhood of ten to one (in the range of 2,500° F. on the hot face sheet and 250° F. on the cold face sheet) superalloys are employed. Examples of these superalloys are TD nickel, niobium, inconel, stainless steel and the like. If thermal insulation of an intermediate differential temperature range is desired, for example, between ten to one and four to one and weight is critical, the hot side half of the multi-layer honeycomb material 10 may be constructed of a superalloy as hereinbefore mentioned, and the cold side half of the multi-layer honeycomb material 10 may be constructed of titanium or titanium alloy. At even lower temperatures, say below the four to one ratio with the hot face sheet being exposed to a temperature of less than 1,000° F. and the cold face sheet being exposed to a temperature in the range of 250° F., the material may be constructed of titanium or titanium alloy on the hot side one half and aluminum on the cold side one half. The multi-layer honeycomb material 10 when constructed in the manner set forth above has sufficient strength to be utilized as supporting space craft structure. If the actual space vehicle is constructed of this material, then separately attached thermal barrier material would not be required, thus lessening space craft weight and economic costs.

Figure 3:
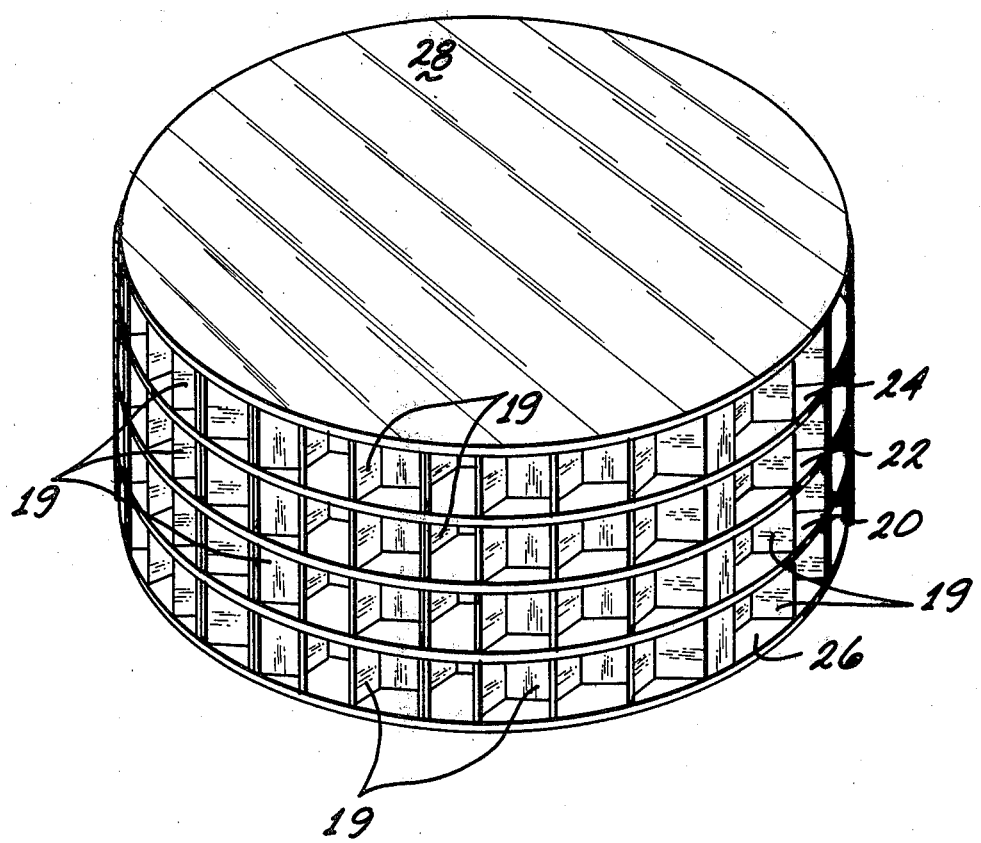
FIG. 3 is a perspective view of a high energy beam mirror utilizing the structure of FIG. 1.

Referring now to FIG. 3 in detail. There is shown the multi-layer material 10 of FIGS. 1 and 2 having a circular configuration. It has been found that this honeycomb multi-layer honeycomb material 10 provides a lightweight structure that can be successfully utilized as a base for a high intensity light reflector. When utilized in this manner, one outer surface of the multi-layer honeycomb material 10 may be precision ground and polished to provide a highly reflective surface. It should be obvious that any type of suitable reflective surface material could likewise be attached the outer surface of the material in a known manner without the requirement of polishing the outer surface of the material itself. It has been found that a multi-layer honeycomb material 10 of approximately 30 inches in diameter, constructed of titanium and having four stacked cores of approximately 2.0 inches, three septum sheets of approximately 0.04 inches between the cores and facing sheets of approximately 0.071 inches provides a suitable mirror base with substantially no detectable surface variances when operated as a mirror to reflect laser beams.

It is further contemplated that a structure having an exceptionally large diameter, say approximately 30 feet, constructed of eight approximately 2.0 inch thick cores, approximately 0.10 inch thick septum sheets and approximately 0.20 inch thick facing sheets would provide a suitable base for a greatly enlarged stable reflective surface. Typically, when used as a base for high intensity reflective surface, the base unit would be pivoted about a selected axis by any well known means.

Although through the various figures, flat components are shown for ease of explanation, curved multi-layer honeycomb material 10 could also be formed. For curved material each of the components must be formed with the same general contour prior to their assembly.

Although the foregoing invention has been described in some detail by illustrations and examples for purposes of clarity and understanding, it should be understood that certain changes and modifications may be practiced within the spirit of the invention, and limited only by the scope of the appended claim.

What is claimed is:

1. Thermal barrier material for use on space type vehicles to insulate during launch and re-entry comprising:
   at least four metal honeycomb cellular cores;
   a first and second metal facing sheet having exposed surfaces; and
   at least three metal septum sheets; said metal honeycomb cellular cores are stacked in the direction of the cell openings with the septum sheets positioned between and physically bonded to their adjacent cellular cores and said facing sheets are positioned and physically attached on the cell surfaces of the outer cores to provide closures therefor whereby when the exposed surface of said first metal facing sheet is subjected to an operating temperature of 1000° F. to 2500° F., said thermal barrier material insulates said second metal facing sheet from said first metal facing sheet wherein the exposed surface temperature of said second metal facing sheet is a maximum of from 25% to 10% of the surface temperature of said first metal facing sheet.

2. The invention as defined in claim 1, wherein said first facing sheet has a highly polished outer surface to thereby provide a mirror like surface.

3. The invention as defined in claim 1 wherein said cellular cores, septum sheets and facing sheets are constructed of titanium alloys.

4. Invention as defined in claim 1 where said cellular cores, septum sheets and facing sheets are constructed of TD nickel.

5. The invention as defined in claim 1, wherein said cellular cores, septum sheets and facing sheets are constructed of columbium.

6. The invention as defined in claim 1, wherein said cores are substantially two inches thick.

7. The invention as defined in claim 1 wherein one surface of the facing sheets and all surfaces of the septum sheets are sequentially plated with layers of silver, copper and nickel.

8. The invention as defined in claim 1 wherein the faying edges of the cellular cores are sequentially plated with layers of silver, copper and nickel.

9. The invention as defined in claim 1 wherein one surface of the facing sheets, all surfaces of the septum sheets and the faying edges of the cellular cores are sequentially plated with silver, copper and nickel.

10. The invention as defined in claim 1, wherein one surface of the facing sheets and all surfaces of the septum sheets are coated with a layer of braze material.

11. The invention as defined in claim 1, wherein one surface of the facing sheets, all surfaces of the septum sheets and the faying edges of the cellular cores are coated with a braze material.

12. The invention as defined in claim 1, wherein a portion of the surface of the facing sheets, septum sheets and the faying edges of the cellular cores are coated with layers of silver, copper and nickel, and the remaining surfaces of the facing sheets and septum sheets and the faying edges of the cellular core are coated with a braze material.

* * * * *